United States Patent
Suzuki et al.

(10) Patent No.: US 9,656,695 B2
(45) Date of Patent: May 23, 2017

(54) VEHICLE REAR PORTION STRUCTURE

(71) Applicant: TOYOTA JIDOSHA KABUSHIKI KAISHA, Toyota-shi (JP)

(72) Inventors: Hiroto Suzuki, Nagoya (JP); Hideyuki Takahashi, Nisshin (JP); Wenfeng Li, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/945,967

(22) Filed: Nov. 19, 2015

(65) Prior Publication Data

US 2016/0185391 A1 Jun. 30, 2016

(30) Foreign Application Priority Data

Dec. 25, 2014 (JP) ................................. 2014-263016

(51) Int. Cl.
*B62D 25/08* (2006.01)
*B62D 21/15* (2006.01)

(52) U.S. Cl.
CPC ......... *B62D 21/152* (2013.01); *B62D 25/087* (2013.01)

(58) Field of Classification Search
CPC ...... B62D 21/15; B62D 21/152; B62D 25/08; B62D 25/087; B60R 19/34
USPC .......... 296/187.11, 193.08, 203.04; 293/133, 293/155
See application file for complete search history.

(56) References Cited

U.S. PATENT DOCUMENTS

| 3,794,348 | A | * | 2/1974 | Fischer | B62D 21/152 188/371 |
| 4,401,341 | A | * | 8/1983 | Hirabayashi | B62D 21/00 296/191 |
| 5,381,871 | A | * | 1/1995 | Ohta | B62D 21/155 180/296 |
| 5,549,350 | A | * | 8/1996 | Akiyama | B62D 25/087 296/203.04 |
| 7,533,913 | B2 | * | 5/2009 | Bae | B60R 19/34 293/132 |

(Continued)

FOREIGN PATENT DOCUMENTS

| JP | 8-175421 | 7/1996 |
| JP | 2006-69279 | 3/2006 |

(Continued)

*Primary Examiner* — Gregory Blankenship
(74) *Attorney, Agent, or Firm* — Oblon, McClelland, Maier & Neustadt, L.L.P.

(57) ABSTRACT

A vehicle rear portion structure includes: a rear side member front-rear direction; a shock absorbing member that is placed at the rear side of the rear side member; and a lower bracket that has a reinforcement portion that is joined to a rear end portion of the rear side member, a load receiving portion that extends downward from a rear end portion of the reinforcement portion and to which the shock absorbing member is joined, and a load transmitting bead portion that is disposed spanning the distance between the load receiving portion and a lower wall portion of the reinforcement portion, with a length L to which the load transmitting bead portion projects in the vehicle front-rear direction becoming longer heading from the load receiving portion to the reinforcement portion.

10 Claims, 7 Drawing Sheets

(56) References Cited

U.S. PATENT DOCUMENTS

| | | | | |
|---|---|---|---|---|
| 8,382,199 B2* | 2/2013 | Bodin | ............... | B62D 21/152 |
| | | | | 280/784 |
| 2008/0277970 A1* | 11/2008 | Egawa | ............... | B62D 25/087 |
| | | | | 296/203.04 |
| 2009/0085380 A1* | 4/2009 | Sakamoto | ......... | B62D 25/2027 |
| | | | | 296/193.08 |
| 2014/0159428 A1* | 6/2014 | Katou | ............... | B62D 25/087 |
| | | | | 296/193.08 |
| 2015/0166122 A1* | 6/2015 | Cho | ............... | B62D 25/2036 |
| | | | | 296/187.11 |
| 2016/0052551 A1* | 2/2016 | Arora | .................... | B60R 19/02 |
| | | | | 296/187.11 |
| 2016/0185391 A1* | 6/2016 | Suzuki | ............... | B62D 25/087 |
| | | | | 296/187.11 |

FOREIGN PATENT DOCUMENTS

| | | | | |
|---|---|---|---|---|
| JP | 2007-069736 | * | 3/2007 | ............ B60R 19/34 |
| JP | 2009-262660 | | 11/2009 | |
| JP | 2012-051454 | | 3/2012 | |
| JP | 2014-8835 | | 1/2014 | |
| JP | 2014-125000 | | 7/2014 | |

* cited by examiner

_US 9,656,695 B2_

VEHICLE REAR PORTION STRUCTURE

CROSS-REFERENCE TO RELATED APPLICATION

This application is based on and claims priority under 35 USC 119 from Japanese Patent Application No. 2014-263016 filed on Dec. 25, 2014, the disclosure of which is incorporated by reference herein.

TECHNICAL FIELD

The present invention relates to a vehicle rear portion structure.

RELATED ART

Vehicle rear portion structures where rear side members placed along the vehicle front-rear direction are disposed in the side portions of the vehicle rear portion are known (e.g., see Japanese Patent Application Laid-open (JP-A) No. 2014-008835, JP-A No. 2009-262660, JP-A No. 2014-125000, JP-A No. H08-175421, and JP-A No. 2006-069279).

Among this type of vehicle rear portion structure, there is a vehicle rear portion structure which, by allowing the rear side members to bend in the vehicle up-down direction in accompaniment with an impact from an impactor on the vehicle rear surface (hereinafter simply called a "rear impact"), absorb the impact energy. In this vehicle rear portion structure, in order to allow the rear side members to bend at predetermined portions (predetermined positions), weak portions such as beads or cutouts serving as bending origins are formed in those predetermined portions.

In this connection, sometimes rear side members having the same configuration are employed from the standpoint of standardizing parts in plural types of vehicles whose vehicle type and country of sale (destination), for example, are different. At the same time, there are cases where, depending on the vehicle type and country of sale, the rear impact performance required of the rear side members is different. Specifically, there are cases where in some types of vehicles the rear side members are allowed to bend in accompaniment with a rear impact while in other types of vehicles the rear side members are not allowed to bend and the impact load is transmitted via the rear side members to the vehicle front portion.

However, when weak portions are formed in predetermined portions of the rear side members as described above, the vehicle front-rear direction rigidity of the rear side members themselves becomes lower and it becomes easier for the rear side members to bend in accompaniment with a rear impact. For that reason, there is the potential for it to become difficult to achieve a standardization of the rear side members in plural types of vehicles in which the rear impact performance required of the rear side members is different as described above.

SUMMARY

In consideration of the circumstances described above, it is an object of the present invention to provide a vehicle rear portion structure with which a standardization of the rear side members can be achieved in plural types of vehicles in which the required rear impact performance is different.

A vehicle rear portion structure pertaining to a first aspect of the present invention includes: a rear side member that is placed along a vehicle front-rear direction at a side portion of a vehicle rear portion; a shock absorbing member that is placed at a vehicle front-rear direction rear side of the rear side member and becomes compressively deformed in accompaniment with input of a load from the vehicle front-rear direction rear side; and a shock absorbing member bracket that has: a reinforcement portion that is joined to a vehicle front-rear direction rear end portion of the rear side member in a state in which at least part of the reinforcement portion is overlaid on a lower surface of the rear end portion, a load receiving portion that extends downward in a vehicle up-down direction from a vehicle front-rear direction rear end portion of the reinforcement portion and to which the shock absorbing member is joined, and a load transmitting projecting portion that projects forward in the vehicle front-rear direction from the load receiving portion and is disposed spanning a distance between the load receiving portion and the reinforcement portion, with a length to which the load transmitting projecting portion projects in the vehicle front-rear direction becoming longer heading from the load receiving portion to the reinforcement portion.

According to the vehicle rear portion structure pertaining to the first aspect, the shock absorbing member bracket is disposed at the vehicle front-rear direction rear end portion of the rear side member. The shock absorbing member bracket has the reinforcement portion, the load receiving portion, and the load transmitting projecting portion.

The reinforcement portion is joined to the rear end portion of the rear side member in a state in which at least part of the reinforcement portion is overlaid on the lower surface of the rear end portion. Because of this, the vehicle up-down direction bending rigidity of the rear side member suddenly changes at the vehicle front-rear direction front end side of the reinforcement portion.

The load receiving portion extends downward in the vehicle up-down direction from the vehicle front-rear direction rear end portion of the reinforcement portion. The shock absorbing member is joined to the load receiving portion. The shock absorbing member is placed at the vehicle front-rear direction rear side of the rear side member. Additionally, when a load is input from the vehicle front-rear direction rear side to the shock absorbing member in accompaniment with a rear impact, the shock absorbing member becomes compressively deformed. Because of this, the impact energy accompanying the rear impact is absorbed. Furthermore, the load that has been input to the shock absorbing member is transmitted via the load receiving portion to the rear side member.

Here, the load transmitting projecting portion is disposed on the load receiving portion. The load transmitting projecting portion is disposed spanning the distance between the load receiving portion and the reinforcement portion, and the length to which the load transmitting projecting portion projects in the vehicle front-rear direction becomes longer heading from the load receiving portion to the reinforcement portion.

Because of this, for example, in a case where a load has been input forward in the vehicle front-rear direction from the shock absorbing member to the load transmitting projecting portion, the load is transmitted via the load transmitting projecting portion and the reinforcement portion upward in the vehicle up-down direction and forward in the vehicle front-rear direction to the rear end portion of the rear side member. As a result, the rear end portion of the rear side member bends in such a way as to point upward in the vehicle up-down direction starting at the front end side of the reinforcement portion where the bending rigidity suddenly changes. Because of this, the impact energy accompanying the rear impact is absorbed.

On the other hand, in a case where a load has been input forward in the vehicle front-rear direction from the shock absorbing member to the corner portion where the reinforcement portion and the load receiving portion meet, the load is transmitted via the reinforcement portion forward in the vehicle front-rear direction to the rear end portion of the rear side member along the lower surface of the rear end portion. In this case, the rear side member resists the load with its vehicle front-rear direction rigidity. For that reason, it becomes difficult for the rear end portion of the rear side member to bend in the vehicle up-down direction starting at the front end side of the reinforcement portion. Consequently, the load that has been input from the shock absorbing member to the load receiving portion in accompaniment with the rear impact is transmitted via the rear side member to the vehicle front portion.

In this way, in the vehicle rear portion structure pertaining to the first aspect, whether or not to allow the rear side member to bend in accompaniment with a rear impact can be controlled by the position where the load is input to the shock absorbing member bracket. Additionally, the position where the load is input to the shock absorbing member bracket can be changed by the cross-sectional shape of the shock absorbing member, for example. Consequently, by changing the cross-sectional shape of the shock absorbing member, for example, depending on whether or not to allow the rear side member to bend in accompaniment with a rear impact, a standardization of the rear side member can be achieved in plural types of vehicles in which the required rear impact performance is different.

A vehicle rear portion structure pertaining to a second aspect of the present invention is the vehicle rear portion structure pertaining to the first aspect, wherein: the shock absorbing member is formed in a tubular shape and is placed in such a way that its axial direction coincides with the vehicle front-rear direction, and a lower wall portion of the shock absorbing member is placed on the vehicle front-rear direction rear side of a vehicle up-down direction lower end portion of the load transmitting projecting portion.

In this way, in the vehicle rear portion structure pertaining to the second aspect, at the time of a rear impact the impact energy can be absorbed in the rear side member because the lower wall portion of the shock absorbing member is placed on the vehicle front-rear direction rear side of the lower end portion of the load transmitting projecting portion.

A vehicle rear portion structure pertaining to a third aspect of the present invention is the vehicle rear portion structure pertaining to the second aspect, wherein: the shock absorbing member has sloping wall portions that extend upward in the vehicle up-down direction and outward in a vehicle width direction from vehicle width direction end portions of the lower wall portion, and corner portions where the lower wall portion and the sloping wall portions meet are placed on the vehicle front-rear direction rear side of the lower end portion of the load transmitting projecting portion.

According to the vehicle rear portion structure pertaining to the third aspect, the corner portions where the lower wall portion and the sloping wall portions of the shock absorbing member meet are placed on the vehicle front-rear direction rear side of the lower end portion of the load transmitting projecting portion. Because of this, in a case where a load has been input from the vehicle front-rear direction rear side to the shock absorbing member in accompaniment with a rear impact, the load is transmitted to the lower end portion of the load transmitting projecting portion via the corner portions where the rigidity is higher compared to other regions of the lower wall portion. As a result, the transmission efficiency of the load transmitted from the lower wall portion of the shock absorbing member to the load transmitting projecting portion is improved. Consequently, the rear end portion of the rear side member can be more reliably allowed to bend at the time of a rear impact.

A vehicle rear portion structure pertaining to a fourth aspect of the present invention is the vehicle rear portion structure pertaining to the first aspect, wherein: the shock absorbing member is formed in a tubular shape and is placed in such a way that its axial direction coincides with the vehicle front-rear direction, and a lower wall portion of the shock absorbing member is placed on the vehicle front-rear direction rear side of a corner portion where the reinforcement portion and the load receiving portion meet.

According to the vehicle rear portion structure pertaining to the fourth aspect, the lower wall portion of the shock absorbing member is placed on the vehicle front-rear direction rear side of the corner portion where the reinforcement portion and the load receiving portion of the shock absorbing member bracket meet. Because of this, in a case where a load has been transmitted from the vehicle front-rear direction rear side to the shock absorbing member in accompaniment with a rear impact, the load is input via the lower wall portion of the shock absorbing member to the corner portion where the reinforcement portion and the load receiving portion meet. The load is transmitted via the reinforcement portion forward in the vehicle front-rear direction to the rear end portion of the rear side member along the lower surface of the rear end portion. For that reason, it becomes difficult for the rear end portion of the rear side member to bend in the vehicle up-down direction starting at the front end side of the reinforcement portion. Consequently, the load that has been input from the shock absorbing member to the load receiving portion is transmitted via the rear side member to the vehicle front portion.

In this way, in the vehicle rear portion structure pertaining to the fourth aspect, the load that has been input from the shock absorbing member to the rear end portion of the rear side member in accompaniment with a rear impact can be transmitted via the rear side member to the vehicle front portion.

A vehicle rear portion structure pertaining to a fifth aspect of the present invention is the vehicle rear portion structure pertaining to any one of the first aspect to the fourth aspect, further including: a rear cross member that is placed along a vehicle width direction at the vehicle rear portion and a cross member bracket that is joined to the rear side member on a vehicle front-rear direction front side of the shock absorbing member bracket and to which the rear cross member is attached, the cross member bracket allowing the rear side member to bend in such a way as to point downward in the vehicle up-down direction starting at a vehicle front-rear direction rear end side of the cross member bracket in accompaniment with the input of a load from the vehicle front-rear direction rear side to the rear side member.

According to the vehicle rear portion structure pertaining to the fifth aspect, the cross member bracket is joined to the rear side member on the vehicle front-rear direction front side of the shock absorbing member bracket. Because of this, in accompaniment with the input of a load from the vehicle front-rear direction rear side, the rear side member becomes bent in such a way as to point downward in the vehicle up-down direction starting at the vehicle front-rear direction rear end side of the cross member bracket.

In this way, in the vehicle rear portion structure pertaining to the fifth aspect, the absorbed amount of impact energy accompanying the rear impact increases because the rear side member becomes bent in the vehicle up-down direction at the rear end side of the cross member bracket in addition to becoming bent at the front end side of the shock absorbing member bracket.

Furthermore, the mode of deformation (deformed shape) of the rear side member is stable because the rear side member becomes bent in the vehicle up-down direction at the front end side of the shock absorbing member bracket and the rear end side of the cross member bracket in accompaniment with the rear impact. Consequently, at the time of a rear impact the impact energy can be efficiently absorbed in the rear side member.

A vehicle rear portion structure pertaining to a sixth aspect of the present invention is the vehicle rear portion structure pertaining to the fifth aspect, further including a rear suspension that is disposed at the vehicle rear portion and supports rear wheels and a suspension bracket that is joined to the rear side member between the shock absorbing member bracket and the cross member bracket and to which the rear suspension is attached, the suspension bracket allowing the rear side member to bend in such a way as to point upward in the vehicle up-down direction starting at one end side, in the vehicle front-rear direction, of the suspension bracket in accompaniment with the input of a load from the vehicle front-rear direction rear side to the rear side member.

According to the vehicle rear portion structure pertaining to the sixth aspect, the suspension bracket is joined to the rear side member between the shock absorbing member bracket and the cross member bracket. Because of this, in accompaniment with the input of a load from the vehicle front-rear direction rear side, the rear side member becomes bent in such a way as to point upward in the vehicle up-down direction starting at the one end side, in the vehicle front-rear direction, of the suspension bracket.

In this way, in the vehicle rear portion structure pertaining to the sixth aspect, the absorbed amount of impact energy accompanying the rear impact increases because the rear side member becomes bent in the vehicle up-down direction at the one end side of the suspension bracket in addition to becoming bent at the front end side of the shock absorbing member bracket and the rear end side of the cross member bracket.

Furthermore, the mode of deformation (deformed shape) of the rear side member is more stable because the rear side member becomes bent in the vehicle up-down direction at the front end side of the shock absorbing member bracket, the rear end side of the cross member bracket, and the one end side of the suspension bracket in accompaniment with the rear impact. Consequently, at the time of a rear impact the impact energy can be more efficiently absorbed in the rear side member.

A vehicle rear portion structure pertaining to a seventh aspect of the present invention is the vehicle rear portion structure pertaining to any one of the first aspect to the sixth aspect, wherein the load transmitting projecting portion includes a triangular-shaped load transmitting bead portion spanning the distance between the reinforcement portion and the load receiving portion as seen from an outer side in the vehicle width direction.

According to the vehicle rear portion structure pertaining to the seventh aspect, the load transmitting projecting portion includes the triangular-shaped load transmitting bead portion spanning the distance between the reinforcement portion and the load receiving portion as seen from the outer side in the vehicle width direction. Because of this, for example, when a load is input from the shock absorbing member to the load transmitting bead portion in accompaniment with a rear impact, the load is transmitted via the load transmitting bead portion and the reinforcement portion upward in the vehicle up-down direction and forward in the vehicle front-rear direction to the rear end portion of the rear side member. As a result, the rear end portion of the rear side member becomes bent in such a way as to point upward in the vehicle up-down direction starting at the front end side of the reinforcement portion where the bending rigidity suddenly changes. Consequently, at the time of a rear impact the impact energy can be efficiently absorbed in the rear side member.

As described above, according to the vehicle rear portion structure pertaining to the present invention, a standardization of the rear side member can be achieved in plural types of vehicles in which the required rear impact performance is different.

BRIEF DESCRIPTION OF THE DRAWINGS

An exemplary embodiment of the present invention will be described in detail based on the following figures, wherein.

DETAILED DESCRIPTION

Figure 1:
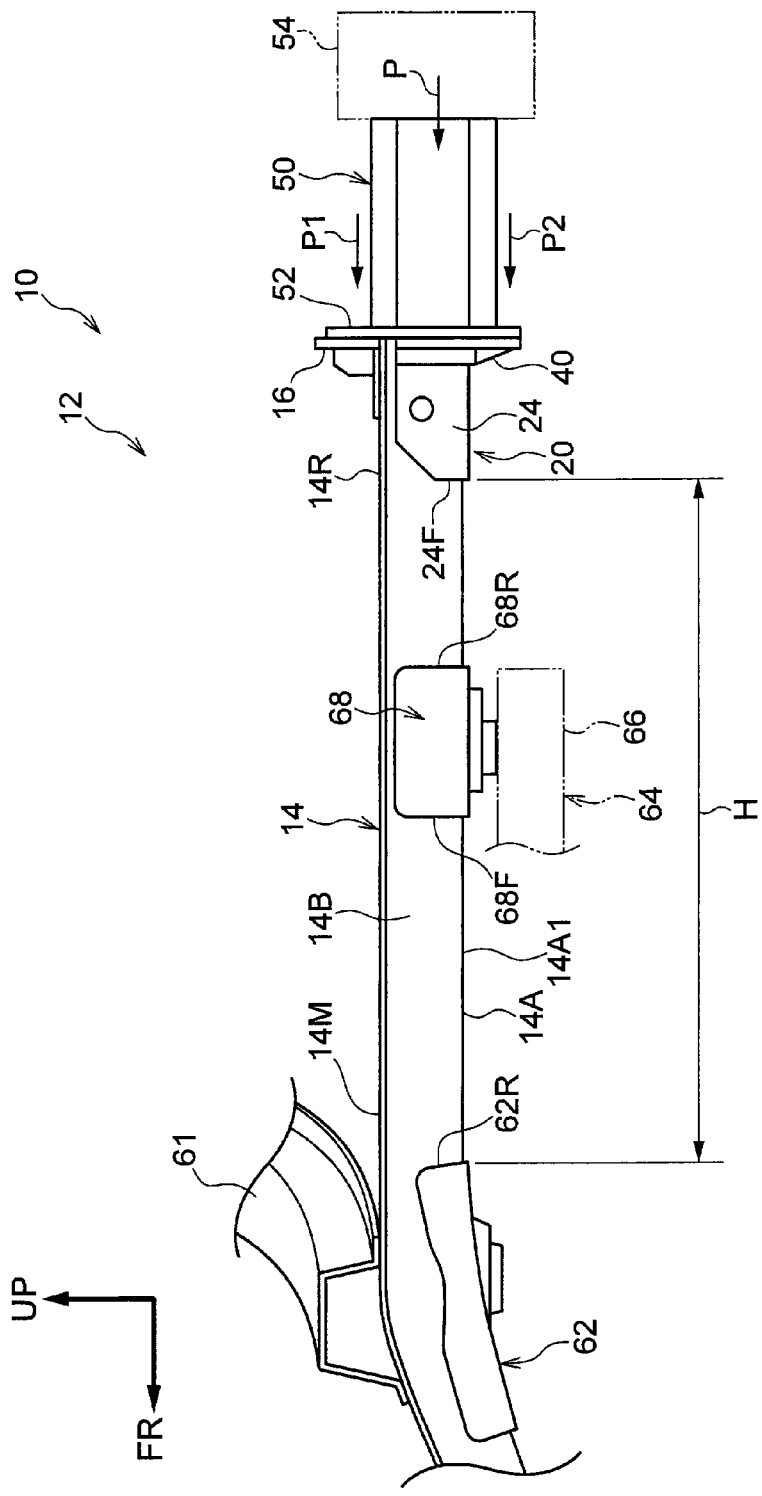
FIG. 1 is a side view, seen from outside in a vehicle width direction, of a vehicle structure to which a vehicle rear portion structure pertaining to the embodiment has been applied.

A vehicle rear portion structure pertaining to an embodiment of the present invention will be described below. It should be noted that arrow FR appropriately shown in the drawings indicates a forward direction in the vehicle front-rear direction. Furthermore, arrow UP indicates an upward direction in the vehicle up-down direction. Moreover, arrow OUT indicates an outward direction (a vehicle body left side) in the vehicle width direction. Furthermore, unless otherwise noted, front and rear and up and down in the following description will be understood to mean front and rear in the vehicle front-rear direction and up and down in the vehicle up-down direction.

(Vehicle Rear Portion Structure)

FIG. 1 shows a vehicle rear portion 12 to which a vehicle rear portion structure 10 pertaining to the present embodiment has been applied. The vehicle rear portion structure 10 is equipped with a pair of rear side members 14, an upper bracket 16, a lower bracket 20, a shock absorbing member 50, and a rear bumper reinforcement 54.

(Rear Side Members)

The pair of rear side members 14 are skeletal members made of metal that configure the skeleton of the side portions on both sides of the vehicle rear portion 12. The pair of rear side members 14 are placed along the vehicle front-rear direction in the side portions at both vehicle width direction sides of the vehicle rear portion 12. It should be noted that FIG. 1 shows only the rear side member 14 on the vehicle body left side of the pair of rear side members 14. Furthermore, the vehicle rear portion 12 in the present embodiment is, for example, configured to be bilaterally symmetrical in relation to its central portion in the vehicle width direction.

Figure 2:
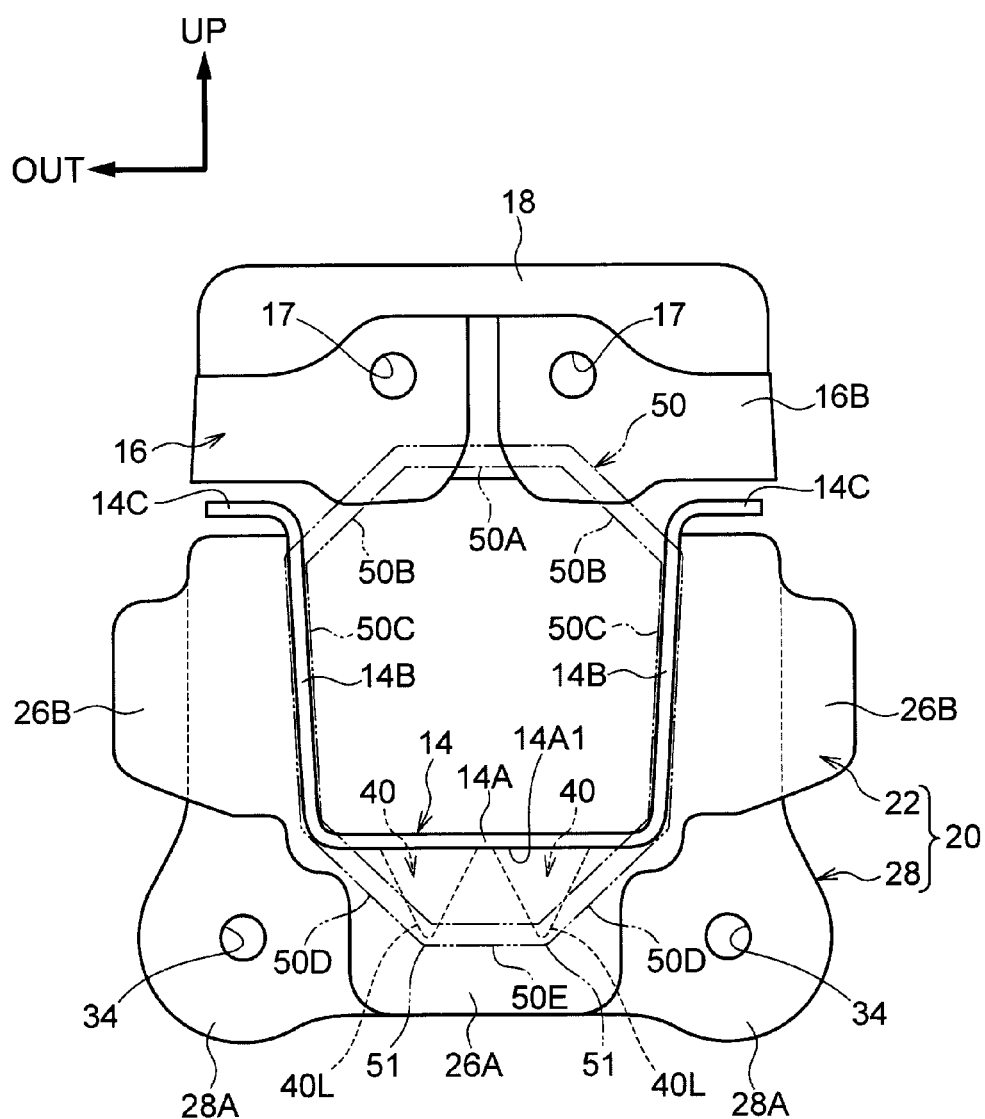
FIG. 2 is a rear view, seen from the rear side in the vehicle front-rear direction, of a rear side member shown in FIG. 1.

As shown in FIG. 2, each rear side member 14 is formed in such a way that its cross-sectional shape seen from the vehicle front-rear direction is a hat shape whose vehicle up-down direction upper side is open. Each rear side member 14 has a lower wall portion 14A, a pair of side wall portions 14B, and a pair of flange portions 14C.

The lower wall portion 14A is placed along the vehicle front-rear direction and the vehicle width direction. Furthermore, the pair of side wall portions 14B extend upward in the vehicle up-down direction from both vehicle width direction end portions of the lower wall portion 14A and oppose one another in the vehicle width direction. Moreover, the pair of flange portions 14C extend outward in the vehicle width direction from the upper end portions of the pair of side wall portions 14B. A non-illustrated floor panel that forms a floor of the vehicle rear portion 12 is joined to the pair of flange portions 14C.

(Upper Bracket and Lower Bracket)

Figure 3:
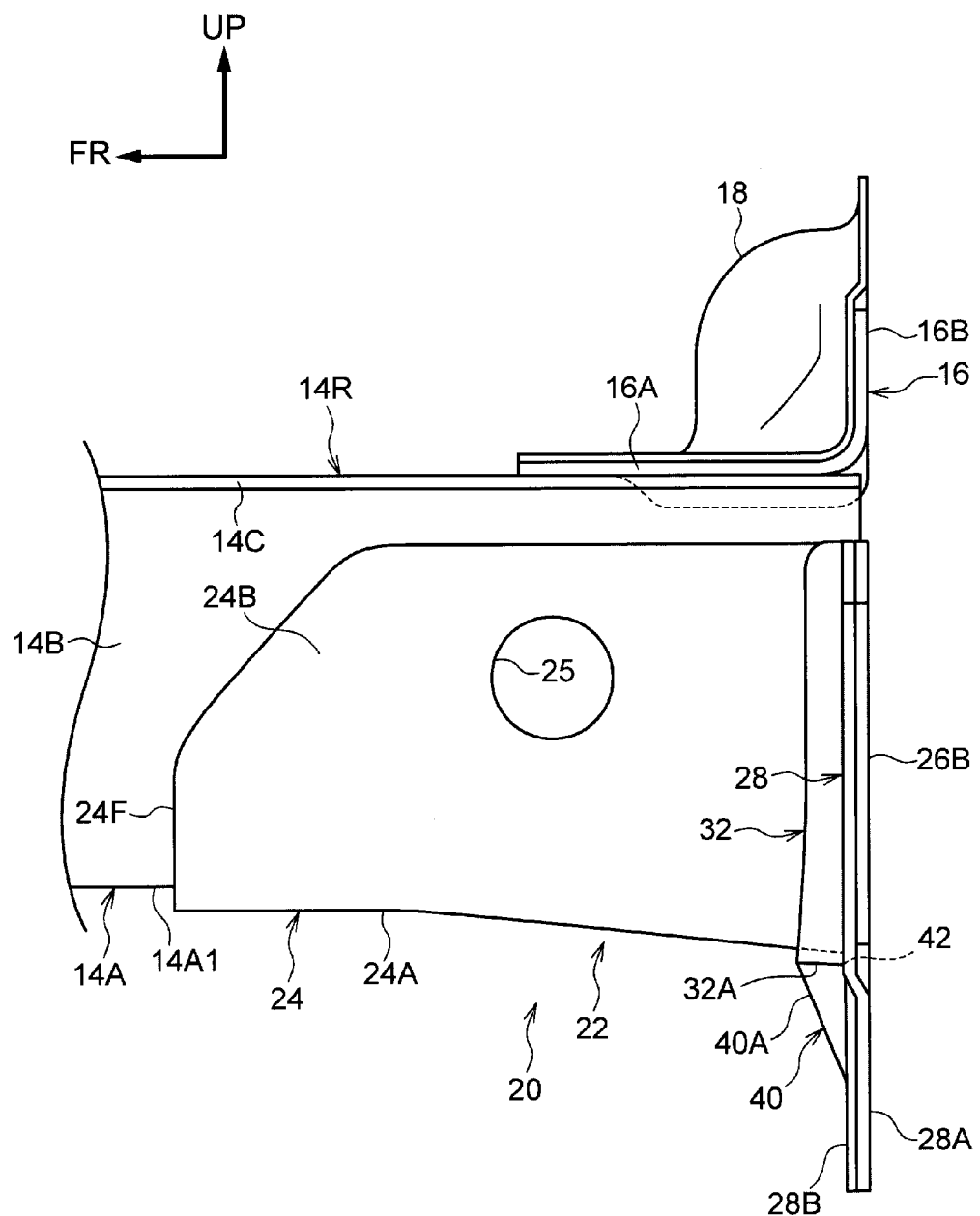
FIG. 3 is a side view, seen from outside in the vehicle width direction, of a vehicle front-rear direction rear end portion of the rear side member shown in FIG. 1.
Figure 4:
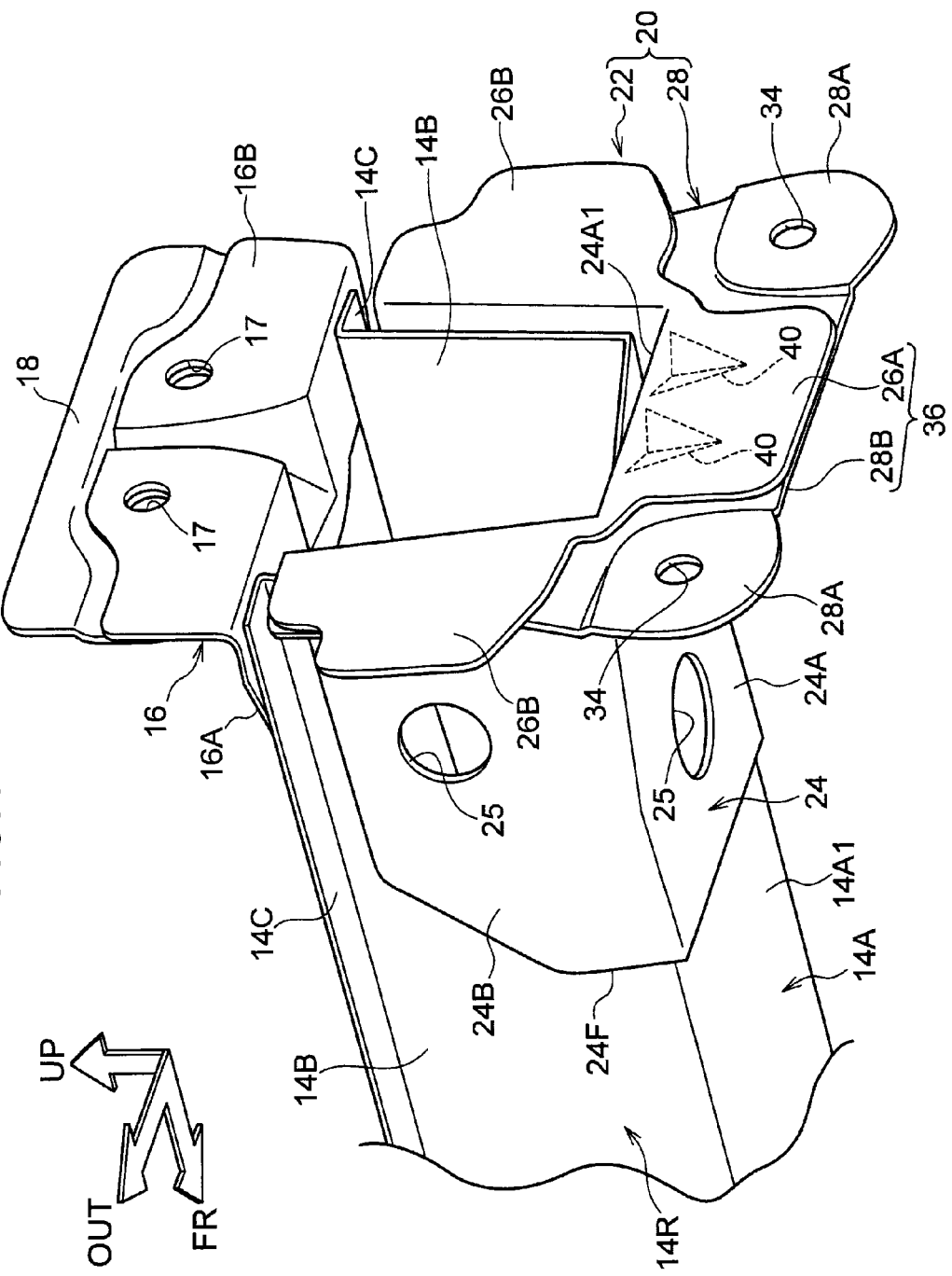
FIG. 4 is a perspective view, seen obliquely from below, of the vehicle front-rear direction rear end portion of the rear side member shown in FIG. 3.
Figure 5:
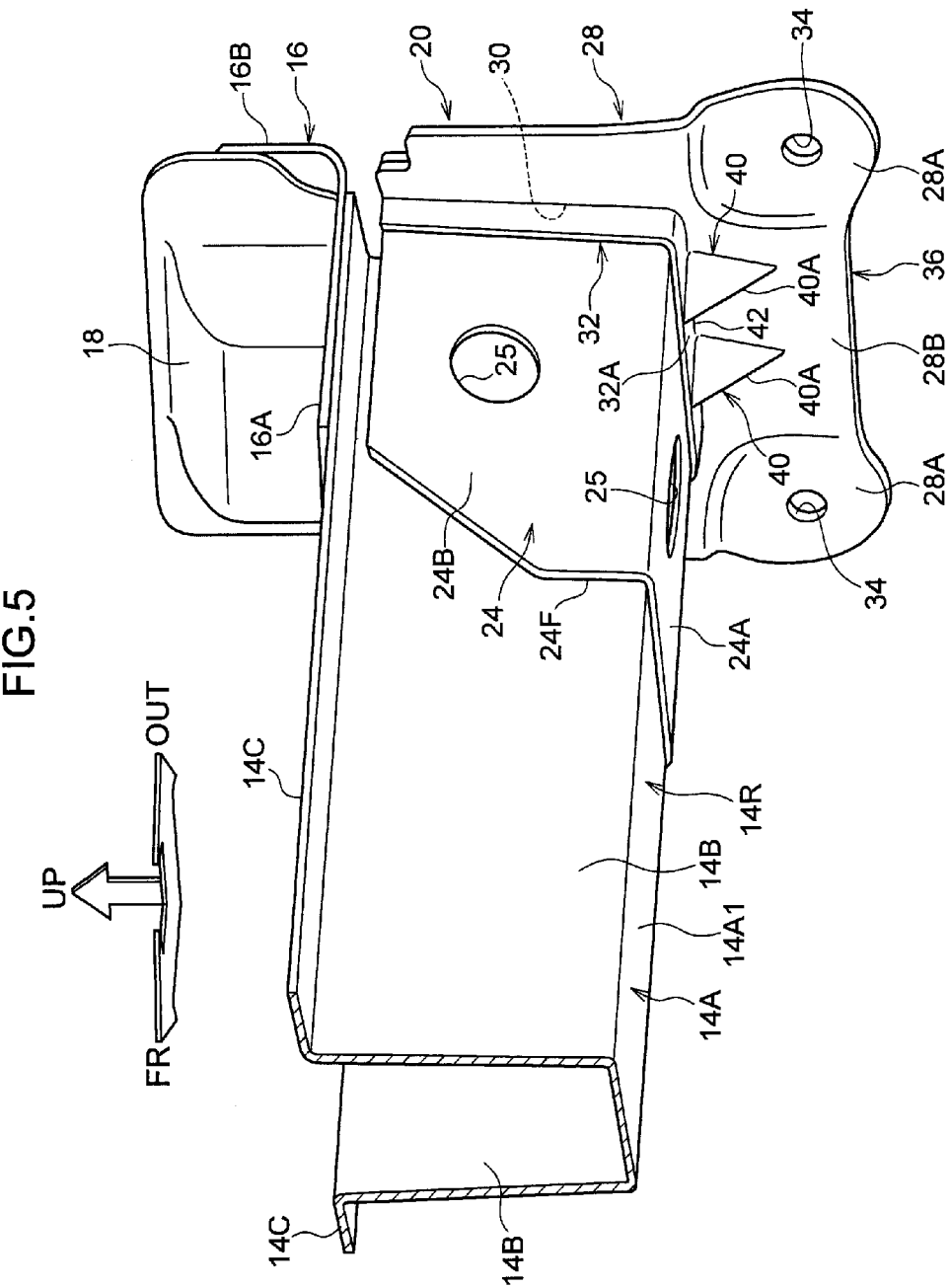
FIG. 5 is a perspective view, seen obliquely from the front, of the vehicle front-rear direction rear end portion of the rear side member shown in FIG. 3.

As shown in FIG. 3, FIG. 4, and FIG. 5, the upper bracket 16 and the lower bracket 20 are disposed on a vehicle front-rear direction rear end portion 14R of the rear side member 14. The upper bracket 16 and the lower bracket 20 are, for example, made of metal. Two types of shock absorbing members 50 and 60 (see FIG. 6) described later are attachable to the upper bracket 16 and the lower bracket 20.

Figure 6:
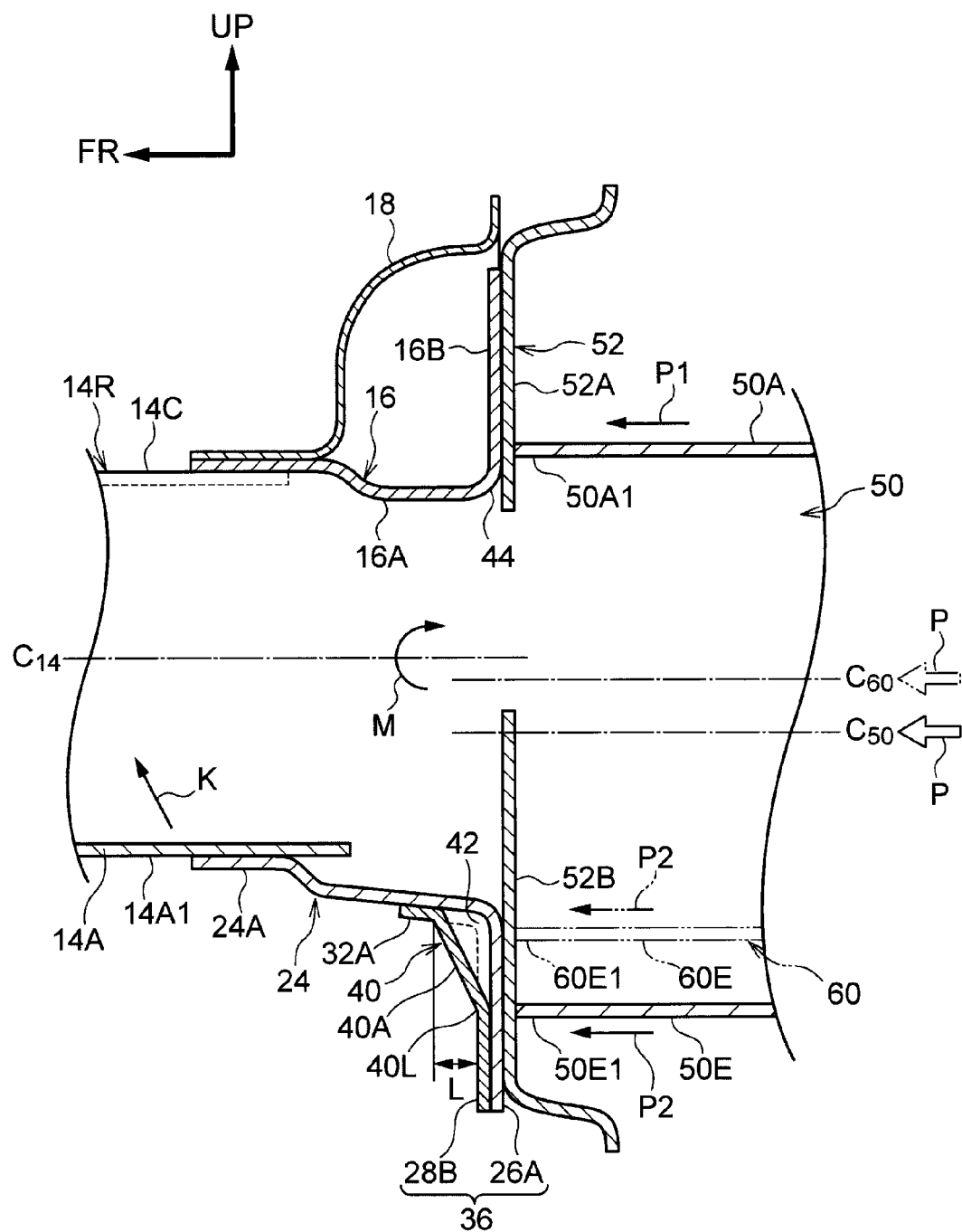
FIG. 6 is a longitudinal sectional view showing the vehicle front-rear direction rear end portion of the rear side member shown in FIG. 3.

As shown in FIG. 6, the upper bracket 16 is formed in such a way that its cross-sectional shape seen from outside in the vehicle width direction is an L-shape. The upper bracket 16 has a base portion 16A and an upper flange portion 16B. The base portion 16A is joined by welding, for example, to the pair of flange portions 14C of the rear end portion 14R of the rear side member 14 in a state in which the base portion 16A is overlaid on the flange portions 14C.

The upper flange portion 16B extends upward in the vehicle up-down direction from the vehicle front-rear direction rear end portion of the base portion 16A. Plural through holes 17 (see FIG. 4) running through the upper flange portion 16B in its thickness direction are formed in the upper flange portion 16B. Non-illustrated bolts for securing to the upper flange portion 16B an upper flange portion 52A of the shock absorbing members 50 and 60 described later are inserted into the through holes 17. A waterproof cover 18 is attached to the upper bracket 16.

As shown in FIG. 4 and FIG. 5, the lower bracket 20 has a bracket body 22 and a flange panel 28. The bracket body 22 has a reinforcement portion 24, which is joined to the rear end portion 14R of the rear side member 14, and plural flange portions 26A and 26B, to which the flange panel 28 is attached. The lower bracket 20 is an example of a shock absorbing member bracket.

The reinforcement portion 24 is formed in such a way that its cross-sectional shape seen from the vehicle front-rear direction is a U-shape (a C-shape) whose vehicle up-down direction upper side is open. The reinforcement portion 24 has a lower wall portion 24A and a pair of side wall portions 24B. The lower wall portion 24A is placed along the vehicle front-rear direction and the vehicle width direction. Furthermore, the pair of side wall portions 24B extend upward in the vehicle up-down direction from both vehicle width direction end portions of the lower wall portion 24A. Through holes 25 for positioning, for example, are formed in the lower wall portion 24A and in the pair of side wall portions 24B.

The rear end portion 14R of the rear side member 14 is inserted (fitted) inside the reinforcement portion 24. Additionally, the reinforcement portion 24 is joined by welding, for example, to the rear end portion 14R of the rear side member 14 in a state in which the lower wall portion 24A of the reinforcement portion 24 is overlaid on a lower surface 14A1 of the rear end portion 14R. Because of this, the vehicle up-down direction bending rigidity of the rear side member 14 suddenly changes at a vehicle front-rear direction front end 24F side of the reinforcement portion 24. For that reason, in a case where a rear impact load P has been input from one type of shock absorbing member 50 described later (see FIG. 6) to the rear end portion 14R of the rear side member 14, it becomes easier for the rear end portion 14R of the rear side member 14 to bend in the vehicle up-down direction starting at the front end 24F side of the reinforcement portion 24.

As shown in FIG. 4, the flange portion 26A is integrally formed on the lower wall portion 24A. The flange portion 26A extends downward in the vehicle up-down direction from a vehicle front-rear direction rear end portion 24A1 of the lower wall portion 24A. Furthermore, the flange portions 26B are integrally formed on the pair of side wall portions 24B. The flange portions 26B extend outward in the vehicle width direction from the vehicle front-rear direction read end portions of the side wall portions 24B. The flange panel 28 is joined by welding, for example, to the vehicle front-rear direction front surfaces of the flange portions 26A and 26B in a state in which the flange panel 28 has been overlaid on the vehicle front-rear direction front surfaces of the flange portions 26A and 26B.

The flange panel 28 is placed along the vehicle up-down direction and the vehicle width direction. As shown in FIG. 5, a rectangular-shaped cutout portion 30 whose vehicle up-down direction upper side is open is formed in the upper portion of the flange panel 28. The reinforcement portion 24 of the bracket body 22 is inserted into the cutout portion 30.

An extension portion 32 that extends forward in the vehicle front-rear direction is integrally formed on the peripheral edge portion of the cutout portion 30. The extension portion 32 extends along the peripheral edge portion of the cutout portion 30 and is formed in a U-shape whose vehicle up-down direction upper side is open as seen from the vehicle front-rear direction. Furthermore, the extension portion 32 is joined by welding, for example, to the lower wall portion 24A and the pair of side wall portions 24B of the reinforcement portion 24 in a state in which the extension portion 32 is overlaid on the lower wall portion 24A and the pair of side wall portions 24B. The extension portion 32 configures part of the reinforcement portion 24. Load transmitting bead portions 40 described later are formed on the part of the extension portion 32A on the lower side.

Regions on both vehicle width direction sides of the lower portion of the flange panel 28 are securement portions 28A to which a lower flange portion 52B (see FIG. 6) of the shock absorbing members 50 and 60 described later is secured. Through holes 34 running through the securement portions 28A in their thickness direction (the vehicle front-rear direction) are formed in the securement portions 28A. Non-illustrated bolts for securing the lower flange portion 52B of the shock absorbing members 50 and 60 to the securement portions 28A are inserted into the through holes 34.

Furthermore, a vehicle width direction middle portion 28B of the lower portion of the flange panel 28 is overlaid on the flange portion 26A (see FIG. 4) and, together with the flange portion 26A, forms a load receiving portion 36. The lower flange portion 52B of the shock absorbing members 50 and 60 described later is joined to the load receiving portion 36, and in accompaniment with a rear impact the rear impact load is input from the shock absorbing members 50 and 60 to the load receiving portion 36. Furthermore, a pair of load transmitting bead portions 40 adjacent to one another in the vehicle width direction are integrally formed on the load receiving portion 36. The load transmitting bead portions 40 are an example of load transmitting projecting portions.

The pair of load transmitting bead portions 40 project forward in the vehicle front-rear direction from the load receiving portion 36 as seen from the outer side in the vehicle width direction and are triangular-shaped bead portions spanning the distance between the load receiving portion 36 and the lower wall portion 24A of the reinforcement portion 24. Furthermore, as shown in FIG. 6, the load transmitting bead portions 40 are formed in a corner portion 42 where the lower wall portion 24A of the reinforcement portion 24 and the load receiving portion 36 meet (are interconnected). More specifically, the load transmitting bead portions 40 are formed by causing the corner portion (ridgeline portion) 42 where the middle portion 28B of the flange panel 28 and the part of the extension portion 32A on the lower side meet (are interconnected) to project (be recessed) in triangular shapes forward in the vehicle front-rear direction and downward in the vehicle up-down direction.

The load transmitting bead portions 40 project forward in the vehicle front-rear direction from the middle portion 28B of the flange panel 28, and a length L to which the load transmitting bead portions 40 project in the vehicle front-rear direction becomes longer heading from the load receiving portion 36 to the reinforcement portion 24. Because of this, ridgeline portions 40A on the projection direction leading end side of the load transmitting bead portions 40 slope relative to the vehicle up-down direction in such a way as to head forward in the vehicle front-rear direction heading from the load receiving portion 36 to the reinforcement portion 24.

(Shock Absorbing Members)

As shown in FIG. 6, in the present embodiment there are two types of shock absorbing members 50 and 60 in accordance with the rear impact performance required of the rear side member 14. The shock absorbing members 50 and 60 are attached to the rear end portion 14R of the rear side member 14 via the upper bracket 16 and the lower bracket 20. Furthermore, the shock absorbing members 50 and 60 are crash boxes made of metal that become compressively deformed in their axial direction in accompaniment with a rear impact and absorb the impact energy.

Here, the one type of shock absorbing member 50 causes the rear end portion 14C of the rear side member 14 to bend in accompaniment with a rear impact to make it possible to absorb the impact energy. In contrast, the other type of shock absorbing member 60 does not cause the rear end portion 14R of the rear side member 14 to bend in accompaniment with a rear impact but makes it possible for the rear impact load P described later to be transmitted via the rear side member 14 to the vehicle front portion (not illustrated in the drawings). Below, first the one type of shock absorbing member 50 will be described and then the differences that the other type of shock absorbing member 60 has compared to the shock absorbing member 50 will mainly be described.

As shown in FIG. 1, the shock absorbing member 50 is placed at the vehicle front-rear direction rear side of the rear side member 14. Furthermore, the rear bumper reinforcement 54 is placed at the vehicle front-rear direction rear side of the shock absorbing member 50. The rear bumper reinforcement 54 is placed along the vehicle width direction at the rear end side of the vehicle rear portion 12. Additionally, at the time of a rear impact a load (hereinafter called a "rear impact load") P heading forward in the vehicle front-rear direction is input via the rear bumper reinforcement 54 to the shock absorbing member 50.

As shown in FIG. 6, the shock absorbing member 50 is formed in a tubular shape and is placed in such a way that its axial direction coincides with the vehicle front-rear direction. A flange panel 52 is disposed on the vehicle front-rear direction front end portion of the shock absorbing member 50.

The flange panel 52 has an upper flange portion 52A, which extends upward in the vehicle up-down direction from the front end portion of the shock absorbing member 50, and a lower flange portion 52B, which extends downward in the vehicle up-down direction from the front end portion of the shock absorbing member 50. The upper flange portion 52A is secured by non-illustrated bolts, for example, to the upper flange portion 16B of the upper bracket 16 in a state in which the upper flange portion 52A is overlaid on the upper flange portion 16B. The lower flange portion 52B is secured by non-illustrated bolts, for example, to the securement portions 28A (see FIG. 4) of the flange panel 28 of the lower bracket 20 in a state in which the lower flange portion 52B is overlaid on the flange panel 28.

Here, in the present embodiment, the cross-sectional shape, for example, of the shock absorbing member 50 is set in such a way that a rear impact load P2 is transmitted to the load transmitting bead portions 40 in accompaniment with a rear impact. Specifically, as indicated by the long dashed double-short dashed lines in FIG. 2, the shock absorbing member 50 is formed in such a way that its cross-sectional shape seen from the vehicle front-rear direction is an octagonal shape. The shock absorbing member 50 has an upper wall portion 50A, a pair of upper sloping wall portions 50B, a pair of side wall portions 50C, a pair of lower sloping wall portions 50D, and a lower wall portion 50E. The lower sloping wall portions 50D are an example of sloping wall portions.

As shown in FIG. 6, a vehicle front-rear direction front end portion 50A1 of the upper wall portion 50A is placed in the vicinity of the vehicle front-rear direction rear side of a corner portion (ridgeline portion) 44 where the base portion 16A and the upper flange portion 16B of the upper bracket 16 meet (are interconnected). Because of this, at the time of a rear impact a rear impact load P1 is transmitted from the upper wall portion 50A of the shock absorbing member 50 to the corner portion 44 of the upper bracket 16. The rear impact load P1 is transmitted via the base portion 16A forward in the vehicle front-rear direction to the rear end portion 14R of the rear side member 14 along the pair of flange portions 14C of the rear end portion 14R.

A vehicle front-rear direction front end portion 50E1 of the lower wall portion 50E is placed on the vehicle front-rear direction rear side of the load transmitting bead portions 40 of the lower bracket 20. Because of this, at the time of a rear impact the rear impact load P2 is transmitted from the lower wall portion 50E of the shock absorbing member 50 to the load transmitting bead portions 40.

Furthermore, as shown in FIG. 2, the pair of lower sloping wall portions 50D extend upward in the vehicle up-down direction and outward in the vehicle width direction from both vehicle width direction end portions of the lower wall portion 50E. Corner portions (ridgeline portions) 51 where the lower wall portion 50E and the pair of lower sloping wall portions 50D meet (are interconnected) are placed on the vehicle front-rear direction rear side of vehicle up-down direction lower end portions 40L of the load transmitting bead portions 40. Because of this, at the time of a rear impact the rear impact load P2 is transmitted to the lower end portions 40L of the load transmitting bead portions 40 from the corner portions 51 where the rigidity is higher than it is in other regions of the lower wall portion 50E.

The concept here that "the corner portions 51 are placed on the vehicle front-rear direction rear side of the lower end portions 40L of the load transmitting bead portions 40" includes not only a case where the corner portions 51 are positioned strictly on the vehicle front-rear direction rear side of the lower end portions 40L of the load transmitting bead portions 40 but also a case where the corner portions 51 are offset in the vehicle up-down direction in relation to the lower end portions 40L in a range in which they can transmit the rear impact load P2 to the lower end portions 40L.

Next, the other type of shock absorbing member 60 will be described. In the other type of shock absorbing member 60, the cross-sectional shape of the shock absorbing member 60 is set in such a way that, in accompaniment with a rear impact, the rear impact load P2 is transmitted to the corner portion 42 where the load receiving portion 36 and the lower wall portion 24A of the reinforcement portion 24 of the lower bracket 20 meet. The structure by which the shock absorbing member 60 is attached to the upper bracket 16 and the lower bracket 20 is the same as that of the shock absorbing member 50.

Specifically, as indicated by the long dashed double-short dashed lines in FIG. 6, a vehicle front-rear direction front end portion 60E1 of a lower wall portion 60E of the shock absorbing member 60 is placed on the vehicle front-rear direction rear side of the corner portion 42. Because of this, in accompaniment with a rear impact the rear impact load P2 is transmitted from the lower wall portion 60E of the shock absorbing member 60 to the corner portion 42.

The concept here that "the front end portion 60E1 of the lower wall portion 60E of the shock absorbing member 60 is placed on the vehicle front-rear direction rear side of the corner portion 42" includes not only a case where the front end portion 60E1 is positioned strictly on the vehicle front-rear direction rear side of the corner portion 42 but also a case where the front end portion 60E1 is offset in the vehicle up-down direction in relation to the corner portion 42 in a range in which it can transmit the rear impact load P2 to the corner portion 42.

Furthermore, when $C_{14}$, $C_{50}$, and $C_{60}$ denote drawing centers of cross sections in which the rear side member 14 and the shock absorbing members 50 and 60 are seen from the vehicle front-rear direction, the drawing center $C_{60}$ of the shock absorbing member 60 is closer to the drawing center $C_{14}$ of the rear side member 14 than the drawing center $C_{50}$ of the shock absorbing member 50. For that reason, it becomes easier for the rear impact load P to be transmitted from the shock absorbing member 60 along the axial direction of the rear side member 14.

In contrast, the drawing center $C_{50}$ of the shock absorbing member 50 is further downward in the vehicle up-down direction from the drawing center $C_{14}$ of the rear side member 14 than the drawing center $C_{60}$ of the shock absorbing member 60. Because of this, in a case where the rear impact load P has been transmitted from the shock absorbing member 50 to the rear side member 14, a moment M generated in the rear end portion 14R of the rear side member 14 becomes larger, so it becomes easier for the rear end portion 14R to be bent in such a way as to point upward in the vehicle up-down direction.

(Rear Cross Member, Rear Side Suspension, Etc.)

As shown in FIG. 1, the vehicle rear portion structure 10 is equipped with a rear cross member 61, cross member brackets 62, a rear suspension 64, and suspension brackets 68.

The rear cross member 61 is placed along the vehicle width direction in the vehicle rear portion 12 and bridges vehicle front-rear direction middle portions 14M of the pair of rear side members 14. End portions on both vehicle width direction sides of the rear cross member 61 are attached to the upper portions of the rear side members 14 via the cross member brackets 62.

The cross member brackets 62 are joined to the outer peripheral surfaces of the middle portions 14M of the rear side members 14. That is, the cross member brackets 62 are joined to the outer peripheral surfaces of the lower portions of the rear side members 14 on the vehicle front-rear direction front side of the lower brackets 20.

More specifically, each cross member bracket 62 is formed in such a way that its cross-sectional shape seen from the vehicle front-rear direction is a U-shape (a C-shape) whose vehicle up-down direction upper side is open. The rear side member 14 is inserted (fitted) inside the cross member bracket 62. Additionally, the cross member bracket 62 is joined by welding, for example, to the lower wall portion 14A and the pair of side wall portions 14B of the rear side member 14. Because of this, the vehicle up-down direction bending rigidity of the rear side member 14 suddenly changes at a vehicle front-rear direction rear end 62R side of the cross member bracket 62. For that reason, in a case where the rear impact load P has been input from the one type of shock absorbing member 50 to the rear end portion 14R of the rear side member 14, it becomes easier for the middle portion 14M of the rear side member 14 to bend in the vehicle up-down direction starting at the rear end 62R side of the cross member bracket 62. A front portion (not illustrated in the drawings) of a suspension member 66 described later is also attached to the cross member brackets 62.

The rear suspension 64 has a suspension member 66 that is placed along the vehicle width direction. The suspension member 66 supports non-illustrated rear wheels in a state in which it bridges the pair of rear side members 14. End portions on both vehicle width direction sides of the suspension member 66 are attached to the lower portions of the rear side members 14 via the suspension brackets 68.

The suspension brackets 68 are joined to the outer peripheral surfaces of the lower portions of the rear side members 14 between the lower brackets 20 and the cross member brackets 62. More specifically, each suspension bracket 68 is formed in such a way that its cross-sectional shape seen from the vehicle front-rear direction is a U-shape (a C-shape) whose vehicle up-down direction upper side is open. The rear side member 14 is inserted (fitted) inside the suspension bracket 68. Additionally, the suspension bracket 68 is joined by welding, for example, to the lower wall portion 14A and the pair of side wall portions 14B of the rear side member 14. Because of this, the vehicle up-down direction bending rigidity of the rear side member 14 suddenly changes at a vehicle front-rear direction front end 68F side and a rear end 68R side of the suspension bracket 68.

Here, of the front end 68F and the rear end 68R of the suspension bracket 68, the front end 68F is closer to a midpoint of an interval H between the front end 24F of the reinforcement portion 24 of the lower bracket 20 and the rear end 62R of the cross member bracket 62. For that reason, in a case where the rear impact load P has been input from the one type of shock absorbing member 50 to the rear end portion 14R of the rear side member 14, it becomes easier for the rear side member 14 to bend in the vehicle up-down direction starting at the front end 68F side of the suspension bracket 68.

Next, the action of the present embodiment will be described.

First, a case where the one type of shock absorbing member 50 is attached via the upper bracket 16 and the lower bracket 20 to the rear end portion 14R of the rear side member 14 will be described.

As shown in FIG. 1, when a non-illustrated impactor impacts on the rear bumper reinforcement 54 from the vehicle front-rear direction rear side, what happens is as follows. Namely, the rear impact load P heading forward in the vehicle front-rear direction is input via the rear bumper reinforcement 54 to the shock absorbing member 50. In accompaniment with the input of the rear impact load P the shock absorbing member 50 becomes compressively deformed in its axial direction (the vehicle front-rear direction). Because of this, the impact energy accompanying the rear impact is absorbed.

Furthermore, the rear impact load P that has been input to the shock absorbing member 50 is transmitted via the upper bracket 16 and the lower bracket 20 to the rear end portion 14R of the rear side member 14. Below, the rear impact load P flowing along the upper wall portion 50A of the shock absorbing member 50 will be called "the rear impact load P1" and the rear impact load P flowing along the lower wall portion 50E of the shock absorbing member 50 will be called "the rear impact load P2".

As shown in FIG. 6, the upper wall portion 50A of the shock absorbing member 50 is placed in the vicinity of the vehicle front-rear direction rear side of the corner portion 44 of the upper bracket 16. Because of this, the rear impact load P1 is transmitted from the upper wall portion 50A of the shock absorbing member 50 via the base portion 16A of the upper bracket 16 to the rear end portion 14R of the rear side member 14 forward in the vehicle front-rear direction along the pair of flange portions 14C.

The lower wall portion 50E of the shock absorbing member 50 is placed on the vehicle front-rear direction rear side of the lower end portions 40L of the load transmitting bead portions 40 of the lower bracket 20. More specifically, as shown in FIG. 2, the corner portions 51 where the lower wall portion 50E and the pair of lower sloping wall portions 50D meet (are interconnected) are placed on the vehicle front-rear direction rear side of the lower end portions 40L of the load transmitting bead portions 40. Because of this, the rear impact load P2 is transmitted to the lower end portions 40L of the load transmitting bead portions 40 from the corner portions 51 where the rigidity is higher than it is in other regions of the lower wall portion 50E. Consequently, the transmission efficiency of the rear impact load P2 transmitted from the lower wall portion 50E of the shock absorbing member 50 to the load transmitting bead portions 40 in accompaniment with the rear impact is improved.

Here, as shown in FIG. 6, the load transmitting bead portions 40 project forward in the vehicle front-rear direction from the load receiving portion 36 and are formed spanning the distance between the load receiving portion 36 and the lower wall portion 24A of the reinforcement portion 24. Furthermore, the length L to which the load transmitting bead portions 40 project in the vehicle front-rear direction becomes longer heading from the load receiving portion 36 to the lower wall portion 24A of the reinforcement portion 24.

Because of this, the rear impact load P2 that has been input from the vehicle front-rear direction rear side to the shock absorbing member 50 in accompaniment with the rear impact is transmitted via the lower wall portion 50E of the shock absorbing member 50 to the lower end portions 40L of the load transmitting bead portions 40. The rear impact load P2 is transmitted via the load transmitting bead portions 40 and the lower wall portion 24A of the reinforcement portion 24 upward in the vehicle up-down direction and forward in the vehicle front-rear direction (the direction of arrow K) to the rear end portion 14R of the rear side member 14.

Figure 7A:
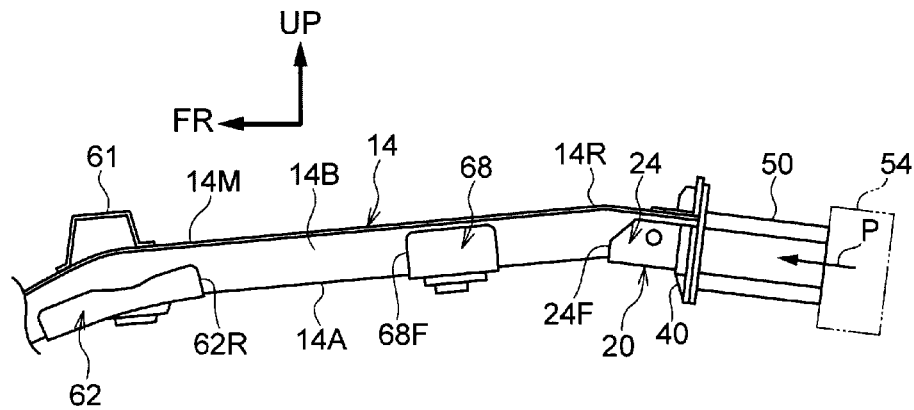
FIG. 7A is a side view showing a deformed state, in the initial stage of a rear impact, of the rear side member shown in FIG. 1.
Figure 7B:
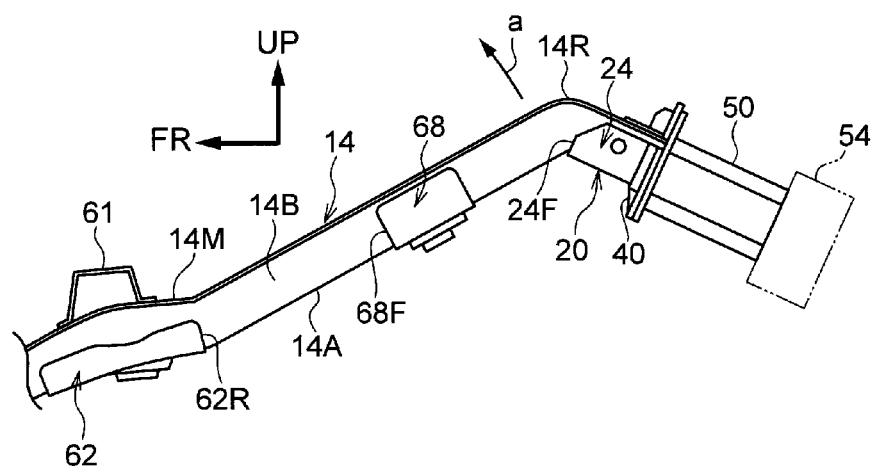
FIG. 7B is a side view showing a deformed state, in the intermediate stage of a rear impact, of the rear side member shown in FIG. 1.

As a result, as shown in FIG. 7A, the rear end portion 14R of the rear side member 14 bends in such a way as to point upward in the vehicle up-down direction starting at the front end 24F side of the reinforcement portion 24. Then, when the rear end portion 14R of the rear side member 14 bends, as shown in FIG. 7B, the rear end portion 14R of the rear side member 14 moves upward in the vehicle up-down direction and forward in the vehicle front-rear direction (the direction of arrow a), and the middle portion 14M of the rear side member 14 bends in such a way as to point downward in the vehicle up-down direction starting at the rear end 62R side of the cross member bracket 62.

Figure 7C:
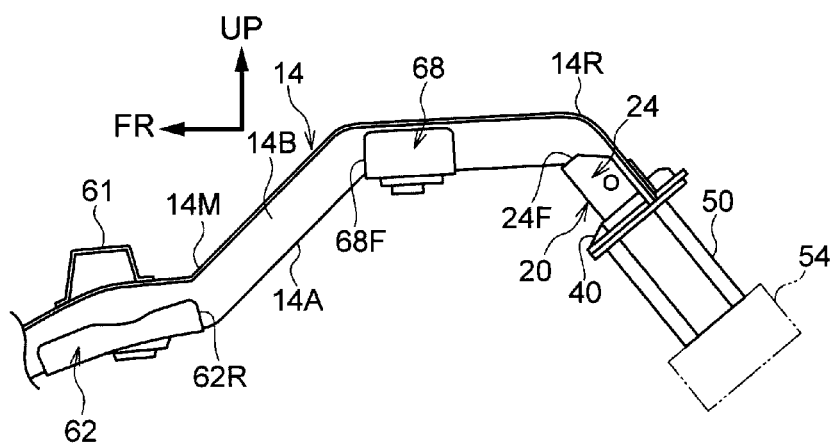
FIG. 7C is a side view showing a deformed state, in the later stage of a rear impact, of the rear side member shown in FIG. 1.

Moreover, when the middle portion 14M of the rear side member 14 bends, as shown in FIG. 7C, the rear side member 14 becomes deformed in such a way as to become folded. In accompaniment with the deformation of the rear side member 14, the region of the rear side member 14 between the lower bracket 20 and the cross member bracket 62 bends in such a way as to point upward in the vehicle up-down direction starting at the front end 68F of the suspension bracket 68.

Because the rear side member 14 becomes bent and deformed in this way, the impact energy accompanying the rear impact is absorbed. Furthermore, in the present embodiment, the mode of deformation (deformed shape) of the rear side member 14 at the time of the rear impact is stable because the rear side member 14 is allowed to bend in the vehicle up-down direction at the front end 24F side of the reinforcement portion 24 of the lower bracket 20, the rear end 62R side of the cross member bracket 62, and the front end 68F side of the suspension bracket 68. Consequently, at the time of a rear impact the impact energy can be efficiently absorbed in the rear side member 14.

Next, a case where the other type of shock absorbing member 60 is attached via the upper bracket 16 and the lower bracket 20 to the rear end portion 14R of the rear side member 14 will be described.

As indicated by the long dashed double-short dashed lines in FIG. 6, the lower wall portion 60E of the shock absorbing member 60 is placed on the vehicle front-rear direction rear side of the corner portion 42 where the reinforcement portion 24 and the load receiving portion 36 of the lower bracket 20 meet (are interconnected) as seen from the outer side in the vehicle width direction.

Because of this, the rear impact load P2 that has been input from the vehicle front-rear direction rear side to the shock absorbing member 60 in accompaniment with the rear impact is transmitted via the lower wall portion 60E of the shock absorbing member 60 to the corner portion 42. The rear impact load P2 is transmitted via the lower wall portion 24A of the reinforcement portion 24 to the rear end portion 14R of the rear side member 14 forward in the vehicle front-rear direction along the lower surface 14A1 of the rear end portion 14R.

In this case, the rear side member 14 resists the rear impact load P with its vehicle front-rear direction rigidity. For that reason, it becomes difficult for the rear end portion 14R of the rear side member 14 to bend in the vehicle up-down direction starting at the front end 24F side of the lower bracket 20. Furthermore, it likewise also becomes difficult for the rear side member 14 to bend in the vehicle up-down direction at the rear end 62R side of the cross member bracket 62 and the front end 68F side of the suspension bracket 68. Consequently, the rear impact loads P1 and P2 that have been transmitted from the shock absorbing member 60 to the rear side member 14 are transmitted via the rear side member 14 to the vehicle front portion.

In this way, in the vehicle rear portion structure 10 pertaining to the present embodiment, whether or not to allow the rear side member 14 to bend can be controlled by the position where the rear impact load P2 is input to the lower bracket 20. Additionally, the position where the rear impact load P2 is input to the lower bracket 20 is changed by the cross-sectional shapes of the two types of shock absorbing members 50 and 60 that attach to the lower bracket 20. More specifically, the position is changed by the vehicle up-down direction position (height) of the lower wall portions 50E and 60E of the shock absorbing members 50 and 60 in relation to the lower bracket 20.

Consequently, for example, in the case of allowing the rear side member 14 to bend in accompaniment with a rear impact, the one type of shock absorbing member 50 is attached to the rear end portion 14R of the rear side member 14. And in the case of not allowing the rear side member 14 to bend in accompaniment with a rear impact but instead transmitting the rear impact loads P1 and P2 via the rear side member 14 to the vehicle front portion, the other type of shock absorbing member 60 is attached to the rear end portion 14R of the rear side member 14. Because of this, a standardization of the rear side member 14 can be achieved in plural types of vehicles in which the rear impact performance required of the rear side member 14 is different.

Furthermore, in the present embodiment, the rear end portion 14R of the rear side member 14 becomes bent in the vehicle up-down direction starting at the front end 24F of the reinforcement portion 24 that reinforces the rear end portion 14R. In other words, in the present embodiment, a weak portion such as a bead or a cutout is not formed in the rear side member 14 itself. For that reason, in the present embodiment, the vehicle front-rear direction rigidity of the rear side member 14 itself does not drop, or, a drop in the rigidity reduced. Consequently, it becomes easy to control whether or not to allow the rear side member 14 to bend in accompaniment with a rear impact as described above.

Next, example modifications of the embodiment will be described.

In the embodiment, the corner portions 51 of the lower wall portion 50E of the shock absorbing member 50 are placed on the vehicle front-rear direction rear side of the lower end portions 40L of the load transmitting bead portions 40, but a region of the lower wall portion 50E outside the corner portions 51 may also be placed on the vehicle front-rear direction rear side of the lower end portions 40L. Furthermore, the lower wall portion 50E of the shock absorbing member 50 may also be placed on the vehicle front-rear direction rear side of the vehicle up-down direction middle portions of the load transmitting bead portions 40.

Furthermore, in the embodiment, the load transmitting bead portions 40 are each formed in a triangular shape as seen from the outer side in the vehicle width direction, but the shape of the load transmitting bead portions 40 is not limited to this. For example, the ridgeline portions 40A of the load transmitting bead portions 40 may also be curved in such a way as to point toward one side in the vehicle front-rear direction as seen from the outer side in the vehicle width direction.

Furthermore, in the embodiment, the cross-sectional shape of the load transmitting bead portions 40 seen from the vehicle front-rear direction is formed in a triangular shape that points forward in the vehicle front-rear direction, but the cross-sectional shape of the load transmitting bead portions seen from the vehicle up-down direction may also be formed in a rectangular shape or a circular arc shape that points forward in the vehicle front-rear direction.

Furthermore, in the embodiment, the pair of load transmitting bead portions 40 are formed on the lower bracket 20, but at least one load transmitting bead portion 40 can be formed on the lower bracket 20.

Furthermore, the load transmitting projecting portion is not limited to the load transmitting bead portion 40. The load transmitting projecting portion may also, for example, be a rib that projects forward in the vehicle front-rear direction from the load receiving portion 36. Furthermore, the load transmitting bead portion 40 and the rib serving as load transmitting projecting portions may also be combined and applied to the embodiment.

Furthermore, in the embodiment, the reinforcement portion 24 of the lower bracket 20 has the lower wall portion 24A and the pair of side wall portions 24B, but it suffices for the reinforcement portion 24 to have at least the lower wall portion 24A.

Furthermore, in the embodiment, the upper bracket 16 and the lower bracket 20 are separate bodies, but the upper bracket 16 and the lower bracket 20 may also be integrated. In this case, the bracket in which the upper bracket 16 and the lower bracket 20 are integrated can be taken as the shock absorbing member bracket.

Furthermore, in the embodiment, the shock absorbing members 50 and 60 are each formed in such a way that their cross-sectional shape seen from the vehicle front-rear direction is an octagonal shape, but the cross-sectional shape of the shock absorbing members 50 and 60 seen from the vehicle front-rear direction may also, for example, be a quadrilateral shape or a pentagonal shape.

Furthermore, in the embodiment, in accompaniment with a rear impact the rear side member 14 becomes bent in the vehicle up-down direction at the front end 68F side of the suspension bracket 68, but the embodiment is not limited to this. For example, the embodiment may also be configured in such a way that the rear side member 14 bends in the vehicle up-down direction at the rear end 68R side of the suspension bracket 68.

An embodiment of the present invention has been described above, but the present invention is not limited to this embodiment. The embodiment and any of the example modifications may also be appropriately combined and used, and the present invention can be implemented in a variety of ways without departing from the spirit thereof.

What is claimed is:

1. A vehicle rear portion structure comprising:
   a rear side member that is placed along a vehicle front-rear direction at a side portion of a vehicle rear portion;
   a shock absorbing member that is placed at a vehicle front-rear direction rear side of the rear side member and becomes compressively deformed in accompaniment with input of a load from the vehicle front-rear direction rear side; and
   a shock absorbing member bracket that has:
      a reinforcement portion that is joined to a vehicle front-rear direction rear end portion of the rear side member in a state in which at least part of the reinforcement portion is overlaid on a lower surface of the rear end portion,
      a load receiving portion that extends downward in a vehicle up-down direction from a vehicle front-rear direction rear end portion of the reinforcement portion and to which the shock absorbing member is joined, and
      a load transmitting projecting portion that projects forward in the vehicle front-rear direction from the load receiving portion and is disposed spanning a distance between the load receiving portion and the reinforcement portion, with a length to which the load transmitting projecting portion projects in the vehicle front-rear direction becoming longer heading from the load receiving portion to the reinforcement portion, wherein:
   the shock absorbing member is formed in a tubular shape and is placed in such a way that an axial direction of the shock absorbing member coincides with the vehicle front-rear direction, and
   a lower wall portion of the shock absorbing member is placed on the vehicle front-rear direction rear side of a vehicle up-down direction lower end portion of the load transmitting projecting portion.

2. The vehicle rear portion structure according to claim 1, wherein:
   the shock absorbing member has sloping wall portions that extend upward in the vehicle up-down direction and outward in a vehicle width direction from vehicle width direction end portions of the lower wall portion, and
   corner portions where the lower wall portion and the sloping wall portions meet are placed on the vehicle front-rear direction rear side of the lower end portion of the load transmitting projecting portion.

3. The vehicle rear portion structure according to claim 1, wherein the length to which the load transmitting projecting portion projects forward in the vehicle front-rear direction becomes longer heading upward in the vehicle up-down direction from a vehicle up-down direction lower end portion of the load transmitting projecting portion.

4. The vehicle rear portion structure according to claim 1, wherein a flange panel joined to the shock absorbing member bracket is disposed on a vehicle front-rear direction front end portion of the shock absorbing member.

5. The vehicle rear portion structure according to claim 4, wherein the flange panel has a lower flange portion that extends downward in the vehicle up-down direction from the front end portion of the shock absorbing member and is joined to the load receiving portion.

6. A vehicle rear portion structure comprising:
   a rear side member that is placed along a vehicle front-rear direction at a side portion of a vehicle rear portion;
   a shock absorbing member that is placed at a vehicle front-rear direction rear side of the rear side member and becomes compressively deformed in accompaniment with input of a load from the vehicle front-rear direction rear side; and
   a shock absorbing member bracket that has:
      a reinforcement portion that is joined to a vehicle front-rear direction rear end portion of the rear side member in a state in which at least part of the reinforcement portion is overlaid on a lower surface of the rear end portion,
      a load receiving portion that extends downward in a vehicle up-down direction from a vehicle front-rear direction rear end portion of the reinforcement portion and to which the shock absorbing member is joined, and
      a load transmitting projecting portion that projects forward in the vehicle front-rear direction from the load receiving portion and is disposed spanning a distance between the load receiving portion and the reinforcement portion, with a length to which the load transmitting projecting portion projects in the vehicle front-rear direction becoming longer heading from the load receiving portion to the reinforcement portion, wherein:
   the shock absorbing member is formed in a tubular shape and is placed in such a way that an axial direction of the shock absorbing member coincides with the vehicle front-rear direction, and
   a lower wall portion of the shock absorbing member is placed on the vehicle front-rear direction rear side of a corner portion where the reinforcement portion and the load receiving portion meet.

7. A vehicle rear portion structure comprising:
   a rear side member that is placed along a vehicle front-rear direction at a side portion of a vehicle rear portion;
   a shock absorbing member that is placed at a vehicle front-rear direction rear side of the rear side member and becomes compressively deformed in accompaniment with input of a load from the vehicle front-rear direction rear side; and
   a shock absorbing member bracket that has:
      a reinforcement portion that is joined to a vehicle front-rear direction rear end portion of the rear side member in a state in which at least part of the reinforcement portion is overlaid on a lower surface of the rear end portion,
      a load receiving portion that extends downward in a vehicle up-down direction from a vehicle front-rear direction rear end portion of the reinforcement portion and to which the shock absorbing member is joined, and a load transmitting projecting portion that projects forward in the vehicle front-rear direction from the load receiving portion and is disposed spanning a distance between the load receiving portion and the reinforcement portion, with a length to which the load transmitting projecting portion projects in the vehicle front-rear direction becoming longer heading from the load receiving portion to the reinforcement portion;

a rear cross member that is placed along a vehicle width direction at the vehicle rear portion; and a cross member bracket that is joined to the rear side member on a vehicle front-rear direction front side of the shock absorbing member bracket and to which the rear cross member is attached, the cross member bracket allowing the rear side member to bend in such a way as to point downward in the vehicle up-down direction starting at a vehicle front-rear direction rear end side of the cross member bracket in accompaniment with the input of a load from the vehicle front-rear direction rear side to the rear side member.

8. The vehicle rear portion structure according to claim 7, further comprising:

a rear suspension that is disposed at the vehicle rear portion and supports rear wheels and a suspension bracket that is joined to the rear side member between the shock absorbing member bracket and the cross member bracket and to which the rear suspension is attached, the suspension bracket allowing the rear side member to bend in such a way as to point upward in the vehicle up-down direction starting at one end side, in the vehicle front-rear direction, of the suspension bracket in accompaniment with the input of a load from the vehicle front-rear direction rear side to the rear side member.

9. A vehicle rear portion structure comprising:

a rear side member that is placed along a vehicle front-rear direction at a side portion of a vehicle rear portion;

a shock absorbing member that is placed at a vehicle front-rear direction rear side of the rear side member and becomes compressively deformed in accompaniment with input of a load from the vehicle front-rear direction rear side; and a shock absorbing member bracket that has:
  a reinforcement portion that is joined to a vehicle front-rear direction rear end portion of the rear side member in a state in which at least part of the reinforcement portion is overlaid on a lower surface of the rear end portion,
  a load receiving portion that extends downward in a vehicle up-down direction from a vehicle front-rear direction rear end portion of the reinforcement portion and to which the shock absorbing member is joined, and
  a load transmitting projecting portion that projects forward in the vehicle front-rear direction from the load receiving portion and is disposed spanning a distance between the load receiving portion and the reinforcement portion, with a length to which the load transmitting projecting portion projects in the vehicle front-rear direction becoming longer heading from the load receiving portion to the reinforcement portion, wherein the load transmitting projecting portion includes a triangular-shaped load transmitting bead portion spanning the distance between the reinforcement portion and the load receiving portion as seen from an outer side in the vehicle width direction.

10. A vehicle rear portion structure comprising:

a rear side member that is placed along a vehicle front-rear direction at a side portion of a vehicle rear portion;

a shock absorbing member that is placed at a vehicle front-rear direction rear side of the rear side member and becomes compressively deformed in accompaniment with input of a load from the vehicle front-rear direction rear side; and a shock absorbing member bracket that has:
  a reinforcement portion that is joined to a vehicle front-rear direction rear end portion of the rear side member in a state in which at least part of the reinforcement portion is overlaid on a lower surface of the rear end portion,
  a load receiving portion that extends downward in a vehicle up-down direction from a vehicle front-rear direction rear end portion of the reinforcement portion and to which the shock absorbing member is joined, and
  a load transmitting projecting portion that projects forward in the vehicle front-rear direction from the load receiving portion and is disposed spanning a distance between the load receiving portion and the reinforcement portion, with a length to which the load transmitting projecting portion projects in the vehicle front-rear direction becoming longer heading from the load receiving portion to the reinforcement portion, wherein the shock absorbing member bracket has a pair of load transmitting projecting portions adjacent to one another in a vehicle width direction.

* * * * *